United States Patent [19]

Stevens et al.

[11] 4,037,737

[45] July 26, 1977

[54] RACK STRUCTURE FOR SUPPORTING ARTICLES

[76] Inventors: James E. Stevens, 2495 Temple Hills Drive, Laguna Beach, Calif. 92651; Randel C. Martin, 34106 Street of the Amber Lantern, Apt. C, Dana Point, Calif. 92629

[21] Appl. No.: 654,140

[22] Filed: Jan. 30, 1976

[51] Int. Cl.² ............................. A47F 7/00; A47K 1/08
[52] U.S. Cl. ..................................... 211/106; 211/181; 248/303
[58] Field of Search ................. 211/50, 119, 106, 181, 211/189, 194; 248/302, 303; 40/124

[56] References Cited
U.S. PATENT DOCUMENTS

| 138,454 | 4/1873 | Van Eps | 40/124 |
| 481,167 | 8/1892 | Elias | 211/106 UX |
| 816,904 | 4/1906 | Early | 40/124 UX |
| 1,619,434 | 3/1927 | Reese | 40/124 |
| 2,777,582 | 1/1957 | Van Dusen | 211/50 X |

*Primary Examiner*—J. Franklin Foss
*Attorney, Agent, or Firm*—Knobbe, Martens, Olson, Hubbard & Bear

[57] ABSTRACT

A suspendible receptacle for generally flat articles comprises wire rod formed into a configuration approximating that of a diamond-shaped parallelogram, provided with hanger means at its upper apex and bent double generally on its horizontal axis to bring its lower apex into proximity with its upper apex to provide between its facing upper and lower portions a pocket to receive generally flat articles.

2 Claims, 5 Drawing Figures

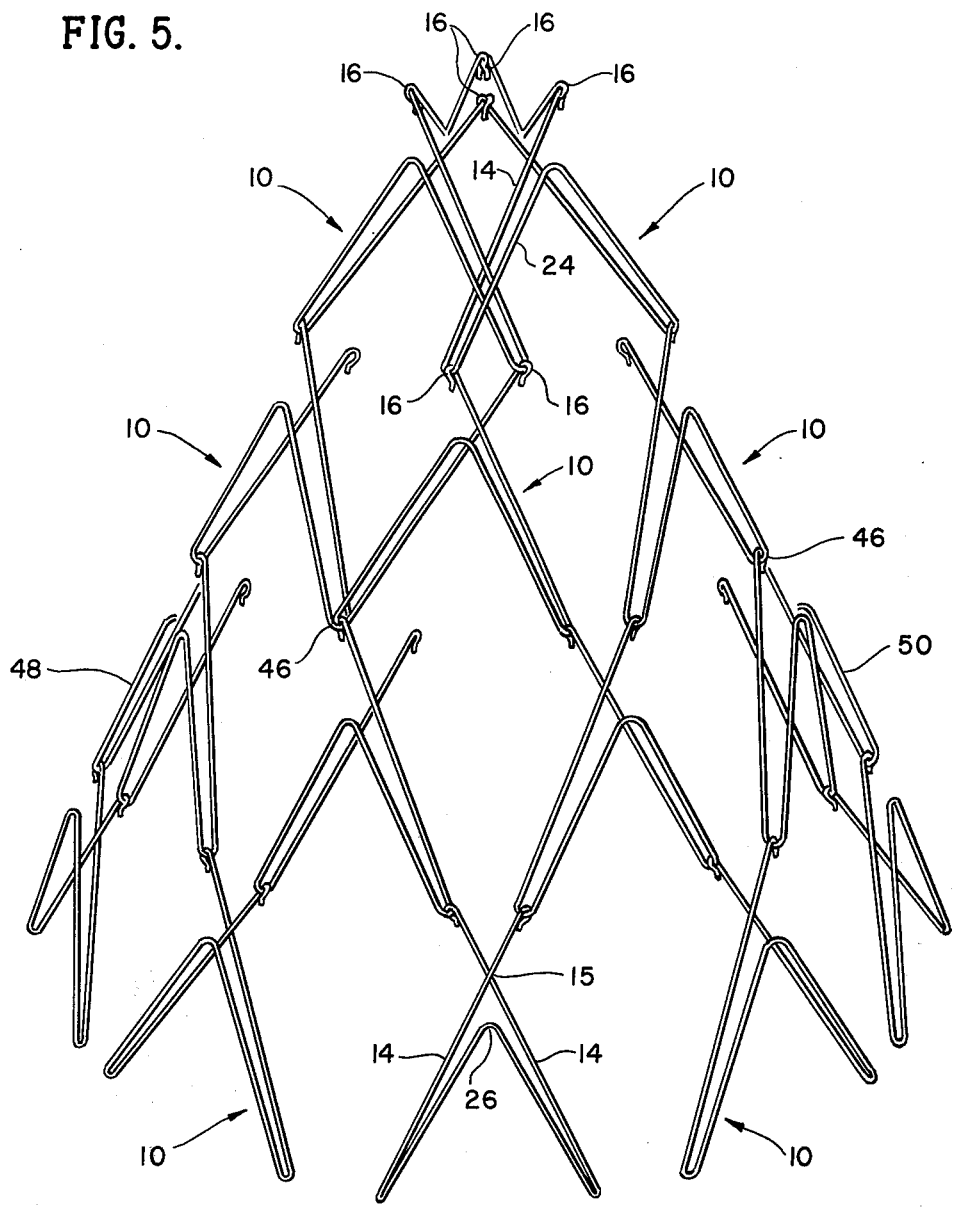

RACK STRUCTURE FOR SUPPORTING ARTICLES

BACKGROUND OF THE INVENTION

Disclosures of typical wire racks for receiving and displaying generally flat articles are found in U.S. Pat. Nos. 138,454 granted Apr. 29, 1873 to Van Eps and 1,619,434 granted Mar. 1, 1927 to Reese. These patents disclose wire rack modules which may be hung from one another to provide for vertical expansion but neither disclosure provides for lateral expansion. Since human beings have limited vertical reach, such as six to seven feet when standing on the floor, but have unlimited capability for lateral movement, the ability to build out wire racks both vertically and laterally from a single suspended first module is of outstanding importance in many situations. This is particularly true where walls to which wire racks are to be attached are of such construction that the mounting of racks requires skill not possessed by a novice, and accordingly, in most instances, hired skill.

SUMMARY OF THE INVENTION

A single style of module embodies the present invention, whether that module is used alone to support articles up to its capacity or whether it serves to suspend other identical modules in a vertical and lateral expansion for the accommodation of additional articles. When viewed in elevation from the front the module, formed of wire rod, resembles a distorted letter X, the distortion residing in the fact that the crossing point is well above the middle of the X so that the appearance is that of short arms and long legs. Each of the arms terminates in a hook and each of the legs terminates in a loop or revertive fold or bend which serve as the base of a pocket for supporting articles and which also serve as points from which an additional module may be suspended by means of the hook at the upper end of one of its arms. A module may be attached to a wall by means of screws or other conventional fastening devices extending through the hooks at the upper ends of its two arms. From each of the two legs of the mounted module another module may be suspended and from the confronting legs of those two modules a fourth module may be suspended, the two hooks at the ends of the arms of that module suspending it from the two confronting legs of the two modules above it. This will stabilize those two modules so that they will stand erect if the starting module stands erect as it presumably would. Fifth and sixth modules may be hung alongside the fourth module from the outer legs of the two modules that jointly are suspending the fourth module. This results in an assembly of six modules, arranged in a triangular pattern of one, two and three modules. In the same manner, from the three modules in a row at the third level down four modules may be suspended and from that row of four another row of five modules may be suspended. The limit to the vertical and lateral expansion of the triangular assembly of modules is determined only by the distance from the apex of the assembly to the base of the wall.

DESCRIPTION OF THE DRAWINGS

For a complete understanding of the invention reference may be had to the following detailed description to be interpreted in the light of the accompanying drawings wherein:

FIG. 5 is a schematic perspective view showing a pyramidal three dimensional assembly of rack structure modules.

DETAILED DESCRIPTION

Figure 1:
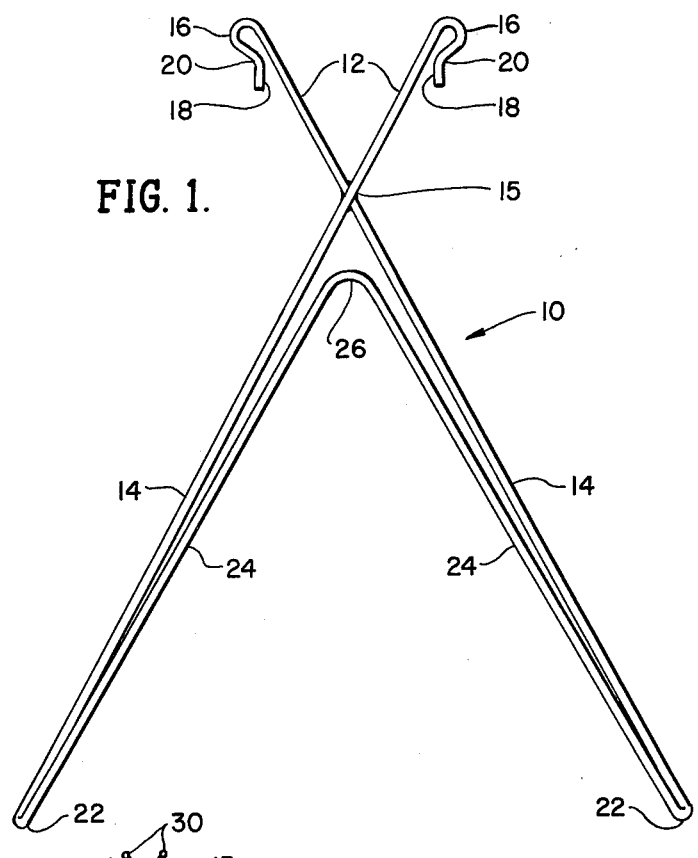
FIG. 1 is a front elevational view of a rack structure module in accordance with the present invention.
Figure 2:
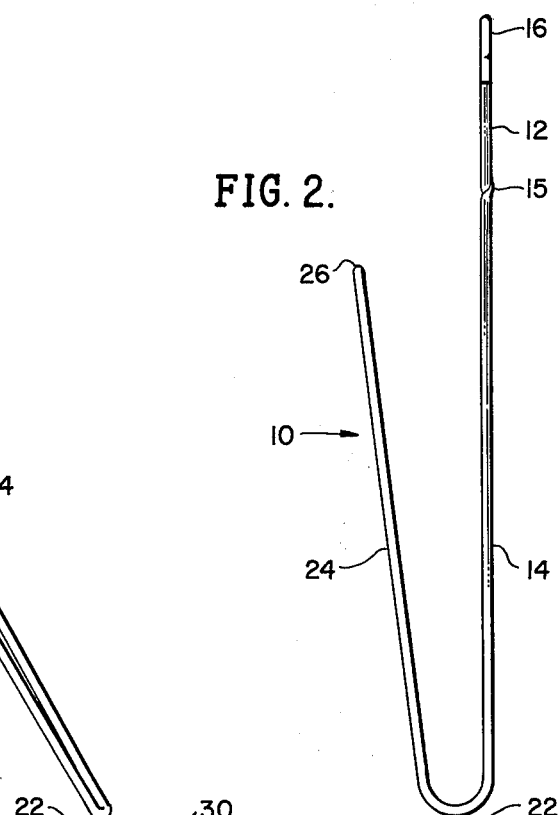
FIG. 2 is a side elevational view of the module shown in FIG. 1.

Referring now to the drawings and particularly to FIGS. 1 and 2 the reference numeral 10 designates generally a rack structure module formed of wire rod in accordance with the present invention. It has the appearance of a letter X having its crossing well above the center of the X configuration to provide the short arms 12 above the crossing and the long legs 14 below the crossing. The upper ends of the arms 12 are bent into hooks 16 and the ends of the hooks 16 are bent outwardly away from the arms 12 to provide entry guides 18 for the hooks. At the points 20 where the hooks are closest to the arms 12 the opening may be slightly less than the diameter of the wire rod of which the rack structure module 10 is formed, so that a slight momentary spreading of the hook occurs as it is fitted to another module for suspension by that module, and this inhibits accidental separation of modules when they are suspended one from another as will be described hereinafter.

The legs 14 terminate in revertive curved bends 22 in the wire rod from which rise the pocket forming extensions 24 which are convergent in a bend 26 that is in front of and spaced from the crossing 15. In the embodiment shown in the drawings bend 26 is a short distance below the crossing 15 although it may be higher or lower than the crossing 15 in accordance with convenience and preference, having due regard to the size of the articles to be deposited in the pocket formed by the legs 14 and the extensions 24.

The rack structure module 10 is preferably formed from a single length of wire rod, and the formation of the module from a length of wire rod may be accomplished by the performance of four different steps. One of these steps may be the bending of the ends of the rod to form the hooks 16 with the entry guides 18. Another step is the bending of the wire rod at its midpoint to form the bend 26. Preferably this bend is in a direction relative to the hooks 16 such that the two hooks lie in the plane defined by the two sides of angle now formed by the bent rod. Another step is to bend the wire rod on each side of the bend 26 less than half the distance from that bend to the hooks 16, symmetrically away from the plane of the bend 26 to produce the bends 22 and to form the legs 14 and arms 12 of the X configuration. Another step is to secure the legs 14 at the crossing 15, in any convenient manner, such as soldering, brazing or welding.

It will be understood that the steps set forth above need not be performed in the described sequence. For example the length of wire might be formed into a planar configuration of an equilateral quadrilateral which might be a square but preferably is a diamond-shaped parallelogram or resembles such a parallelogram, below the crossing 15, before or after the formation of the hooks 16 and before or after the securing of the crossing portions of the wire rod at the crossing 15. Formation of the pocket could then be accomplished by bending the lower portion of the parallelogram forwardly and upwardly to form the bends 22 and to bring the lower apex of the parallelogram into the desired position of proximity relative to the crossing 15 of the X configuration.

Figure 3:
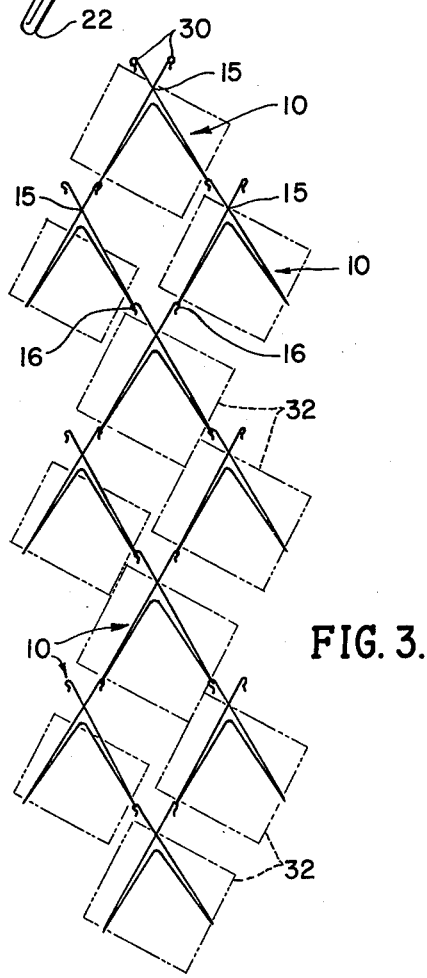
FIGS. 3 and 4 are schematic showings of two different patterns for assembling a plurality of the rack structure modules with dotted line representations of articles placed in the modules.

FIG. 3 shows an assembly of rack structure modules that provides stability in a minimal lateral expanse. The starting point is a single module 10 secured to a wall by means of headed fasteners 30 which may be nails or screws, in a suspension to provide horizontal alignment of the bottom of the pocket formed by the curves 22, identifiable in FIG. 1. From each of the pocket forming bends another module 10 is suspended, the one on the left by its hook on the right hand arm above the crossing 15 and the one on the right by is left hand arm. From the confronting sides of the two modules 10 in the second level a single module 10 is suspended by means of its two hooks 16. This stabilizes the two modules 10 in the second level and also stabilizes the single added module 10. At the fourth level two modules may be suspended from the single module at the third level, at the fifth level a single module may be suspended from the two at the fourth level and so on down toward the base of the wall, preferably ending with a single module to be stable in itself and to stabilize the two modules from which it is suspended.

The assembly of rack modules is now ready to receive the articles to be supported by it and the dotted rectangles 32 represent such articles. These might be magazines or books or perhaps phonograph records in the flat envelopes in which single disc records are customarily supplied. As indicated in FIG. 3 the rectangular articles 30 are preferably deposited in the receptacles by inserting one of the corners of the object downwardly between the two sides of the receptacle so that two adjacent sides of the rectangular object rest on the two bends 22 forming the pocket. The object is thus retained by gravity in the pocket without any tendency to slide out laterally.

Figure 4:
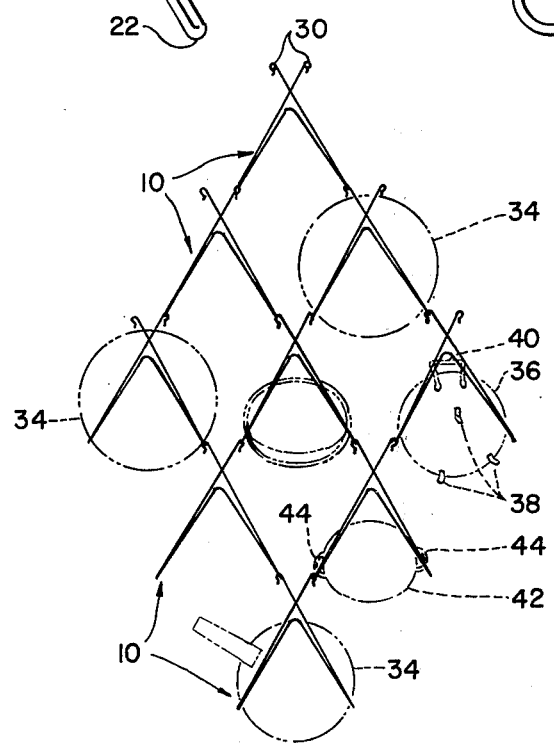

FIG. 4 shows a configuration for assembly of a rack structure that provides for building out laterally as well as vertically. As in FIG. 3 a single module 10 is secured to a wall by headed fasteners 30 passed through the hooks at the top of the module. Also as in the case of FIG. 3 two modules are suspended from the first module, but instead of suspending a single module in the third level from the two in the secnd level a full compliment of three modules is suspended from the two modules in the second level. In the fourth level only two modules have been shown in FIG. 4, corresponding to the two modules in the fourth level in FIG. 3. It will be recognized however that a module may be suspended from each of the two outer modules in the third level to provide a maximum of four modules in the fourth level. FIG. 4 has been ended with a single module in line below the module at the top of FIG. 4, which corresponds to the single module in the fifth level of FIG. 3. It will be understoodhowever that the four modules that may be provided at the fourth level will suspend a maximum of five modules at the fifth level and that these five will in turn support six modules at the sixth level. The amount of lateral expansion is limited only by the vertical space to accommodate the vertical expansion. It will be noted that if full lateral growth is employed the structure grows as a continuously enlarging triangle.

It may be noted that if, in assembling modules in the manner above described, the bottom row has a maximum of modules the two at the ends of the row will not be stably suspended because only one hook 16 of each is connectible to a module in the row above. This situation may be remedied in either of two ways. One way is to provide means for attaching the free hooks directly to the wall, in the same manner that the apex module in the assembly is suspended. The other way is to omit the two outermost modules from the lowest row.

FIG. 4 contains a showing of circular objects deposited in the pockets of the rack assembly, represented by the dotted circular outlines 34. These may be disc-like objects such as covers for cooking vessels or they may be cooking vessels themselves, such as shallow pie or cake pans, and shallow frying pans. The dotted outline 36 at the right of FIG. 4 represents a colander which is a deep perforated vessel, usually provided with feet 38 and a handle 40 and although such an object is too deep to be fitted into the pocket in one of the modules 10 it may be hung with its underside, which is convex, facing outwardly, by slipping the handle 40 behind the bend 26 in the front part of the module 10. Elongate objects having one of their dimensions shorter than the distance between the loops forming the pocket of a module, such as the tray 42 with handles 44, may be accommodated by orienting the articles with the long dimension horizontal.

FIG. 5 shows in schematic perspective form a pyramidal assembly of the receptacle modules 10. Since a perspective rendering of a pyramidal assembly of the rack structure modules has the appearance of a lattice work it was concluded that an attempt to show more than approximately 180° would become very confusing because the modules in the pyramid on the opposite side from the side viewed directly would become a multiplicity of lines crisscrossing those of the modules in the front without in any way enhancing the three dimensional appearance of the assembly of modules.

The minimum number of modules at the apex from which to build a pyramid downwardly is, of course, three modules. In FIG. 5 the apex of the pyramid has four modules, as evidenced by the interlocking of four pairs of hooks 16. In the specific embodiment of the pyramid shown in FIG. 5 one side of one of the two front modules 10, as specifically shown in FIG. 5 the right hand side of the left hand module, extends into the pocket of the right hand module. From the lower ends of the crisscrossed arms of the two modules a module 10 in the next row down is suspended by its two hooks 16. This reduces the rate at which the pyramid flares outwardly because the two modules facing forwardly at the apex of FIG. 5 at the apex of the pyramid in FIG. 5, these being the only two apex modules that are fully shown in the drawing, are pulled in close together by being overlapped.

Three complete modules are shown as facing forwardly and outwardly at the second level, four complete modules are shown at the third level and five at the fourth level. It will be noted that in building levels of modules increasing in number downwardly from the top the number of hooks exceeds the number of module pocket loops to which they may be connected, and some hooks must be left unconnected, two being shown unconnected in the second level down and three in the third level down in order that the structure may expand downwardly. Also it may be desirable or necessary to link together two modules in one row by a single hook of a module in the row below as indicated by the reference numeral 46 at two places in the suspending of the third ring of modules from the second.

When the pyramid has been flared to a point where the spacing between contiguous loops at the bottom of adjacent modules is substantially the same as the spacing between the hooks of the modules the flaring of the structure may be terminated and the building of rings of modules downwardly from that point on may involve the utilization of uniform numbers of modules in the rings, so that from that point on downwardly the configuration of the structure is cylindrical rather than pyramidal. It will be noted that at the extreme ends of the showing of four complete modules in the third ring of modules in FIG. 5 a fragment of the next module on each side, identified by the reference numerals 48 and 50 on the left and right hand sides respectively, is shown. Upon this basis it may be supposed that the third ring of modules down from the apex is comprised of the remainder of each of the two fragmentally shown modules and four modules on the back for a total of ten modules. If it be presumed that the second ring of modules counting downwardly from the apex is comprised of six modules these would accommodate a total of twelve hooks but a ring of ten modules would have a total of twenty hooks and it would follow from this that some of the hooks would not be used, actually eight hooks, three of which are shown in the third row in FIG. 5.

In the fourth row down from the apex of the pyramid in FIG. 5 we see five complete modules and their ten hooks are attached to the four modules shown in full in the third row of modules and to the two fragmentally shown modules 48 and 50. The portions of the fragmentally shown modules that are missing from FIG. 5 would accommodate two more hooks and four additional complete modules at the back of the third row of modules would accommodate eight hooks so that the fourth row down may consist of ten modules hanging generally vertically with their twenty hooks engaging the ten modules in the row above. In like manner the bottom row, if it consists of ten modules will accommodate twenty hooks of another closed rings of ten modules and this could be continued downwardly to any extent desired.

Because of the loose articulation of the rings of modules to the rings of modules above them an assemblage of modules such as that depicted in FIG. 5 is not capable of being a free standing structure. Accordingly it will be understood that it must be suspended and it will be understood that wires may be attached to junctions of the pairs of hooks 16 at the top of the structure, at least to two opposite pairs or to all four pairs, for the purpose of suspending the entire assemblage of modules, as for example, from a ceiling. The structure could be made free standing, if a permanent structure were to be desired, by welding the hooks of modules in a ring to the modules in the ring next above.

What is claimed is:

1. A receptacle for generally flat articles comprising: a length of wire rod conformed generally to the configuration of an equilateral quadrilateral with the free ends of the rod crossed to define one apex of said quadrilateral and provided with an article receiving pocket formed by revertively bending said rod generally at the side apices of said quadrilateral to bring into proximity to the rod-crossing apex of said quadrilateral the opposite apex thereof and having the free ends of the rod extend beyond the crossing equal distances and each end bent into the configuration of a hook for suspending the receptacle, the bending of the hook being in a direction transverse to the direction of the bends forming the article receiving pocket thereby to accommodate suspending one receptacle from another by engaging a hook of said one receptacle with a pocket forming bend of said other receptacle.

2.

A receptacle for generally flat articles comprising: wire rod formed into the configuration of a letter "X" unsymmetrical about the crossing to provide short and equal arms above the crossing and long and equal legs below the crossing;

each of said arms being bent at its free end into the configuration of a hook for suspending the receptacle;

each of said legs terminating in an arcuate revertive bend from which rise pocket-forming portions directed convergently toward said crossing and merging in the vicinity of said crossing and spaced outwardly therefrom;

said arcuate revertive bends being directed transversely of the direction of bending of the hooks at the ends of the arms to accommodate suspending one receptacle from another by engaging a hook of one with a revertive bend of the other; and · said arms, legs, bends, and merging pocket-forming portions all being components of a single unbroken lengthof wire rod.

* * * * *

UNITED STATES PATENT AND TRADEMARK OFFICE
CERTIFICATE OF CORRECTION

PATENT NO. : 4,037,737

DATED : July 26, 1977

INVENTOR(S) : James E. Stevens and Randel C. Martin

It is certified that error appears in the above-identified patent and that said Letters Patent are hereby corrected as shown below:

Column 3, line 16, change "is" to --its--; line 49, change "secnd" to --second--; line 60, put space between "understood" and "however".

Column 6, line 49, put space between "length" and "of".

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*